(12) United States Patent
Vertente et al.

(10) Patent No.: US 7,420,120 B2
(45) Date of Patent: Sep. 2, 2008

(54) FLEXIBLE CONDUIT AND CABLE

(75) Inventors: Michael J. Vertente, Fairhaven, MA (US); Robert A. Pereira, Rochester, MA (US); Skip N. Afdasta, Coventry, RI (US)

(73) Assignee: WPFY, Inc., Wilmington, DE (US)

( * ) Notice: Subject to any disclaimer, the term of this patent is extended or adjusted under 35 U.S.C. 154(b) by 0 days.

(21) Appl. No.: 11/003,658

(22) Filed: Dec. 3, 2004

(65) Prior Publication Data

US 2006/0131044 A1   Jun. 22, 2006

(51) Int. Cl.
*H02G 3/04* (2006.01)
(52) U.S. Cl. .................. 174/68.1; 174/68.3; 174/70 C; 138/118
(58) Field of Classification Search ............... 174/65 R, 174/60, 68.1, 68.3, 135, 95, 99 R, 72 A, 72 R, 174/72 C, 98, 650, 115, 36, 47, 70 C; 220/3.8, 220/3.7; 439/207, 208, 209, 210, 215; 138/118, 138/118.1, 119, 177, 178; 285/117, 149.1, 285/223, 32; 57/210, 243; 139/383 R, 404, 139/408, 409, 420 R, 421, 426 TW, 420 A; 428/369, 35.8, 36.92, 34.1, 34.2, 34.3, 34.4, 428/34.5, 35.7
See application file for complete search history.

(56) References Cited

U.S. PATENT DOCUMENTS

| | | | |
|---|---|---|---|
| 817,057 A | 4/1906 | Greenfield | |
| 1,068,553 A | 7/1913 | Abell et al. | |
| 1,596,215 A | 8/1926 | Palmer | |
| 1,617,583 A | 2/1927 | Fentress | |
| 1,813,039 A | 7/1931 | Escol | |
| 1,913,390 A | 6/1933 | Hungerford | |
| 1,995,407 A | 3/1935 | Walker | |
| 2,086,152 A | 7/1937 | Bedell | |
| 2,118,630 A | 5/1938 | Waldron | |
| 2,143,072 A | 1/1939 | Johnson | 166/4 |
| 2,464,124 A | 3/1949 | Duvall | |
| 2,628,998 A | 2/1953 | Frisbie | |
| 2,944,337 A | 6/1960 | Coleman | |
| 3,073,944 A | 1/1963 | Yuter | |
| 3,361,871 A * | 1/1968 | Brandt | 174/112 |
| 3,474,559 A | 10/1969 | Hunt | |
| 3,551,542 A | 12/1970 | Perrone | |
| 3,551,586 A | 12/1970 | Dembiak et al. | |
| 3,682,203 A | 8/1972 | Foti et al. | |
| 3,815,639 A | 6/1974 | Westerbarkey | |
| 3,835,615 A | 9/1974 | King, Jr. | 52/758 |
| 3,865,146 A | 2/1975 | Meserole | |
| 4,141,385 A | 2/1979 | Siegwart | |
| 4,197,728 A | 4/1980 | McGowen | |
| 4,248,459 A | 2/1981 | Pate et al. | 285/319 |
| 4,278,836 A * | 7/1981 | Bingham | 285/32 |

(Continued)

FOREIGN PATENT DOCUMENTS

JP         49-20780         6/1972

*Primary Examiner*—Angel R Estrada
(74) *Attorney, Agent, or Firm*—Wyatt B. Pratt

(57) ABSTRACT

A flexible conduit or cable for electrical wiring having at least one break location along the length of the conduit or cable that is visible on an outer surface of the conduit or cable. The break location enables the conduit or cable to be broken. Also provided is a method for producing the flexible conduit or cable, and an apparatus that includes the flexible conduit or cable.

20 Claims, 6 Drawing Sheets

U.S. PATENT DOCUMENTS

| | | | |
|---|---|---|---|
| 4,280,225 A | | 7/1981 | Willis |
| 4,467,138 A | * | 8/1984 | Brorein ....................... 174/115 |
| 4,552,989 A | | 11/1985 | Sass |
| 4,729,628 A | * | 3/1988 | Kraft et al. ............... 174/117 F |
| 4,778,543 A | | 10/1988 | Pan |
| 4,947,568 A | | 8/1990 | De Barbieri |
| 5,180,890 A | * | 1/1993 | Pendergrass et al. .... 174/131 R |
| 5,189,719 A | | 2/1993 | Coleman et al. |
| 5,221,267 A | | 6/1993 | Folden ....................... 604/200 |
| 5,397,155 A | | 3/1995 | Inda et al. ....................... 285/4 |
| 5,468,914 A | * | 11/1995 | Falciglia et al. .............. 174/112 |
| 5,486,654 A | * | 1/1996 | Hanak et al. ................... 174/36 |
| 5,603,479 A | | 2/1997 | Kristy ........................ 248/548 |
| 5,651,081 A | | 7/1997 | Blew et al. |
| 5,719,353 A | | 2/1998 | Carlson et al. |
| 6,323,421 B1 | * | 11/2001 | Pawson et al. .............. 174/68.1 |
| 6,494,496 B1 | | 12/2002 | Sweeney ..................... 285/115 |
| 6,825,418 B1 | * | 11/2004 | Dollins et al. ................ 174/112 |
| 7,045,707 B1 | * | 5/2006 | Galasso ..................... 174/68.3 |
| 7,049,508 B2 | * | 5/2006 | Bushey et al. .............. 174/68.3 |
| 7,193,159 B2 | * | 3/2007 | Makwinski et al. ......... 174/68.3 |

\* cited by examiner

FLEXIBLE CONDUIT AND CABLE

TECHNICAL FIELD

This description relates to flexible conduit and cable.

BACKGROUND

Flexible conduit and cable used to carry electrical power in buildings, for example, typically include insulated conductors protected in a helically wound (and therefore flexible) steel or aluminum sheath (also called armor). Other kinds of flexible conduit use sheathing or armor that is not helically wound but is formed in other ways, for example, by seam welding of sheet metal or using non-metallic materials. Conduit refers to a product in which the conductors are not installed until after the conduit is manufactured, for example, after it is mounted in the building. Cable refers to conduit in which the conductors are installed during manufacture. When used to wire a building, the cable or conduit is pulled from a coil or reel and cut to appropriate lengths using a cutter, a saw, or other tool. The ends of each length are attached to metal boxes and connections to the conductors are made within the boxes.

SUMMARY

In general, in one aspect, an apparatus includes a length of a flexible conduit or cable for electrical wiring, and at least one break location along the length of the conduit, the break location enabling the conduit or cable to be broken by hand manipulation of the conduit or cable.

Implementations may include one or more of the following features. The break location is a weakened location of the conduit, for example, a location of reduced thickness of a wall of which the conduit or cable is formed. The wall of the conduit or cable comprises a strip of material that is wound to form the conduit or cable. The location of reduced thickness includes a groove or perforations. The thickness is reduced on both inside and outside surfaces of the wall. The wall includes steel or aluminum and the thickness is reduced to insure a desired degree of breakability and still comply with safety standards. The location of reduced thickness comprises a line. The break locations are at intervals along a length of the conduit or cable. A wall of the flexible conduit or cable is formed of turns of a strip and the intervals are at least as frequent as the turns of the strip. The break locations occur at regular intervals along the length of the conduit or cable. The break locations are visible on an outer surface of the conduit or cable. The flexible conduit or cable comprises a helically wound metal strip. There are conductors within the conduit or cable. The outside of the conduit or cable may bear indicia, for example, color.

In general, in another aspect, an apparatus includes a length of helically wound flexible conduit formed of a convoluted strip of steel, transverse weakening grooves formed at successive locations along the length of the strip, and insulated electrical conductors housed within the conduit.

In general, in another aspect, a method includes forming a length of flexible conduit or cable to include at least one break location along the length of the conduit, the break location enabling the conduit or cable to be broken by hand manipulation of the conduit or cable.

Implementations may include one or more of the following features. The forming includes creating a series of break locations along a length of a strip, and winding the strip to form the conduit or cable. Creating the series of break locations includes forming grooves on both surfaces of the strip.

In general, in another aspect, a method includes severing a supply of flexible conduit or cable to produce a length of flexible conduit or cable by hand manipulation of the conduit or cable to cause it to break at one of a series of break locations formed along the length of the conduit or cable during manufacture of the conduit, and using the length in electrical wiring of a structure.

In some implementations, the hand manipulation includes rupturing an armor of which the conduit or cable is formed, between two successive helical windings of a metal strip that forms the flexible conduit or cable and bending, twisting, or contorting the strip at a location between the two windings to sever the length of flexible conduit or cable.

In general, in another aspect, a building contains electrical wiring within lengths of flexible conduits or cables, each of at least some of the lengths of flexible conduits or cables having at least one break location along the length of the conduit, the break location enabling the conduit or cable to be broken by hand manipulation of the conduit or cable.

Other advantages and features will become apparent from the following description and claims.

DETAILED DESCRIPTION

Figure 1:
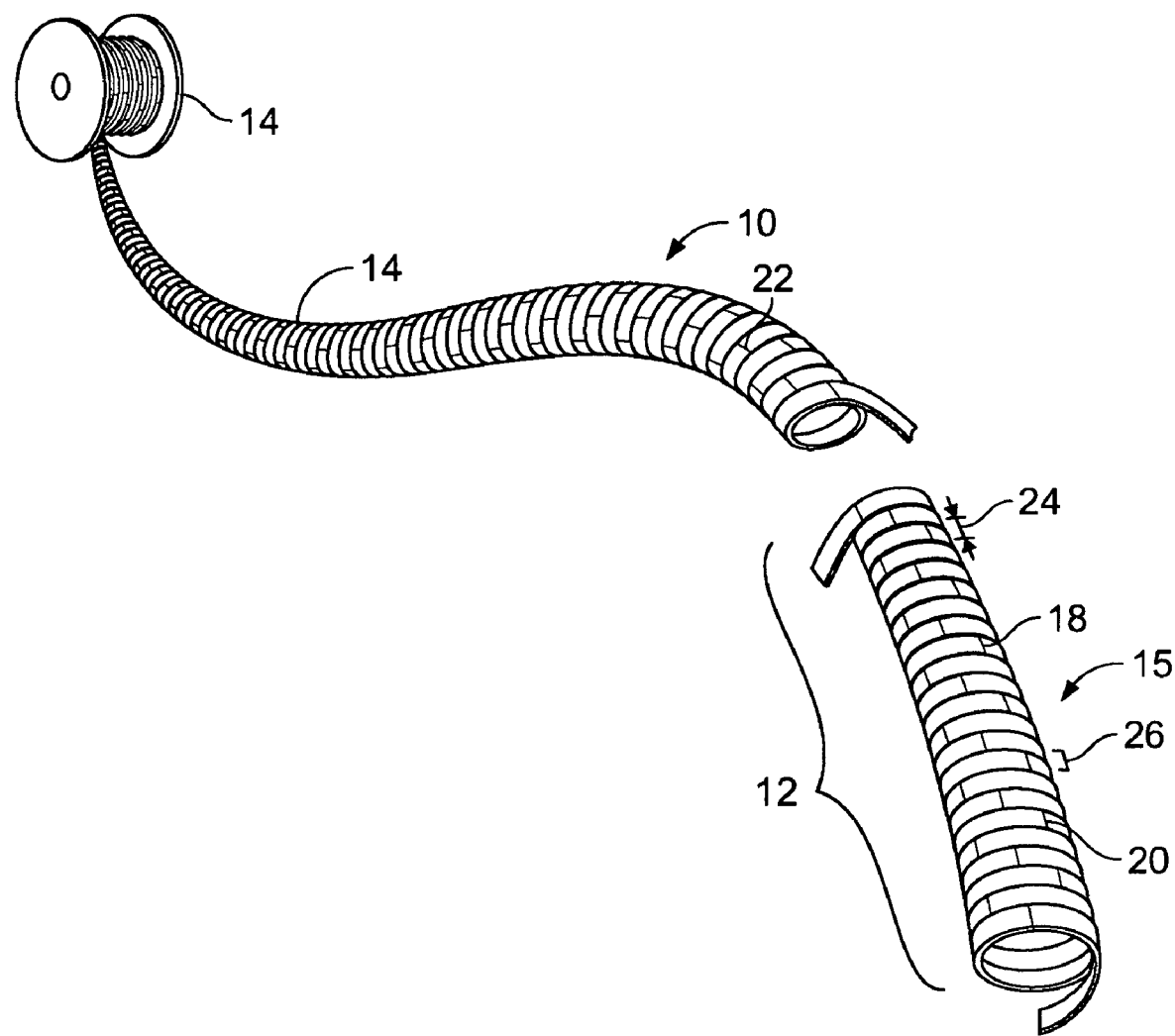
FIG. 1 shows a flexible conduit.
Figure 2:
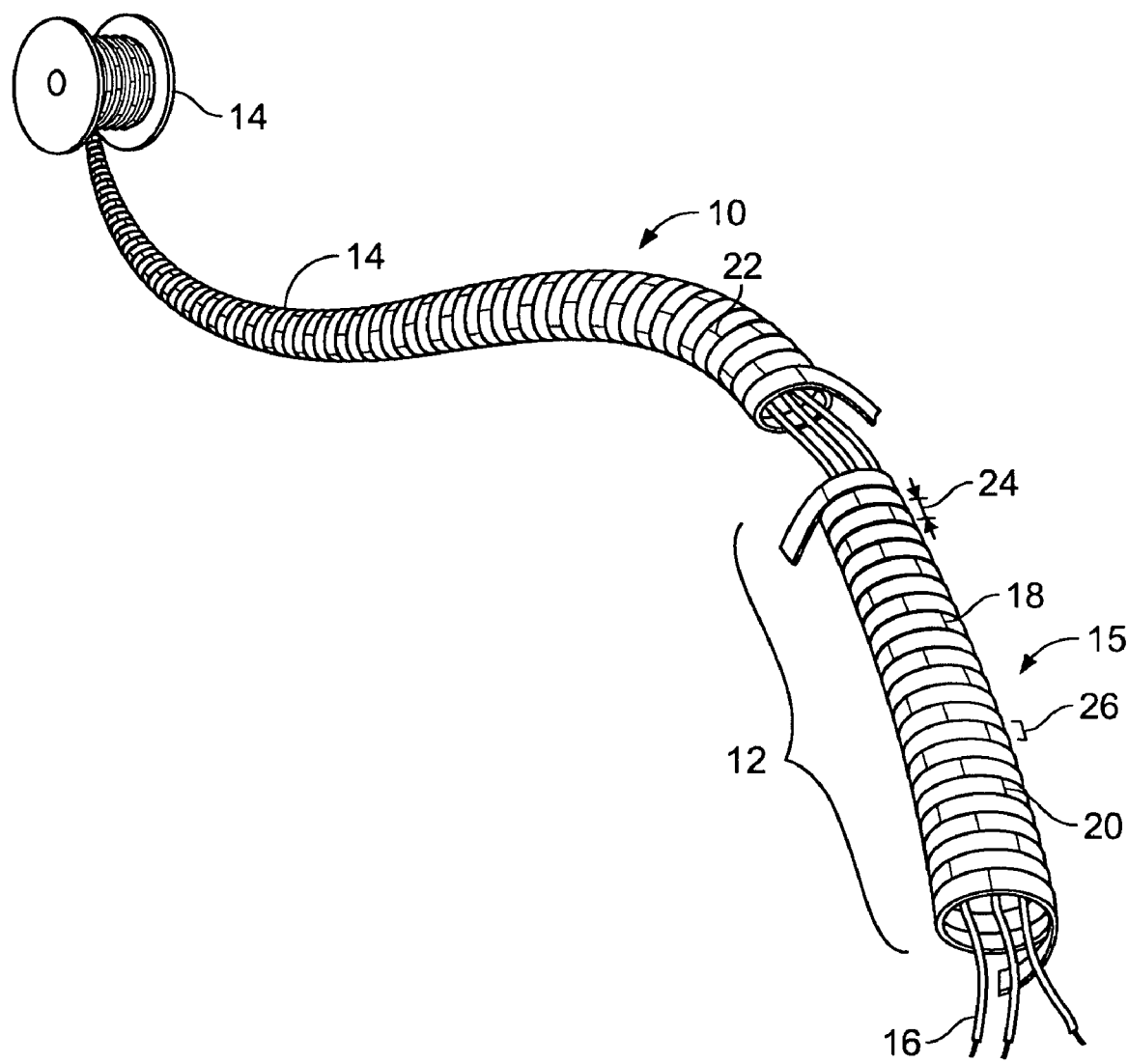
FIG. 2 shows an armored cable.

As shown in FIGS. 1 and 2, by appropriately configuring a helically wound flexible steel conduit or cable 10, a length 12 of the conduit or cable may be easily separated from a longer piece or a supply 14 (e.g., a coil or reel) of conduit, for example, by breaking the armor by hand, without the need to use a cutter, saw, or other tool. Being able to separate the armor easily reduces the effort, difficulty, and cost of working with the conduit and the cable 15 of which it is a part. The armor continues to protect the internal conductors 16 effectively and complies with relevant "code" requirements and nationally recognized testing laboratory requirements such as crush, impact, bendability, and tensile (pull apart) strength.

In some examples, the armor is made easy to separate (e.g., to break) by providing breaking points 18, 20, 22 along its length. Each breaking point represents a place where the steel or aluminum can be broken apart by twisting, bending, and/or contorting the armor, sometimes by doing so back and forth more than once.

The breaking points can be located at regular intervals 24 along the length of the conduit or cable or armor, or in other examples, at irregular intervals. The intervals of separation between successive breaking points can range from quite small (many breaking points on every turn 26 of the strip) to quite large (one breaking point per foot or more).

Figure 3:
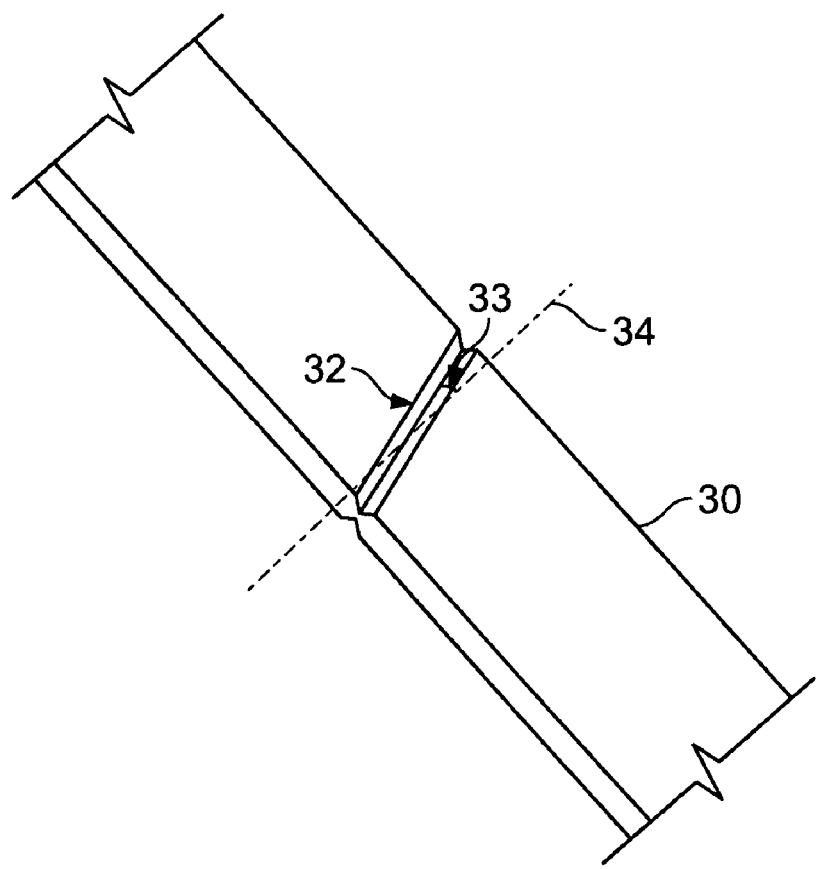
FIGS. 3 and 4 are top and side views of a strip.

As shown in FIG. 3, in some examples, the breaking points (only one is shown in FIG. 3) are formed in a steel or aluminum strip 30 before the strip is helically wound to form the armor of the conduit or cable. In some cases, at each breaking point, a break line 32 is formed straight across the strip from one side to the other at an angle 33 of about 15 degrees to a line 34 that is normal to the length of the conduit. In other examples, the angles may range from 0 to close to 90 degrees. Angles that are relatively large may produce sharp tips on the severed strip.

Figure 4:
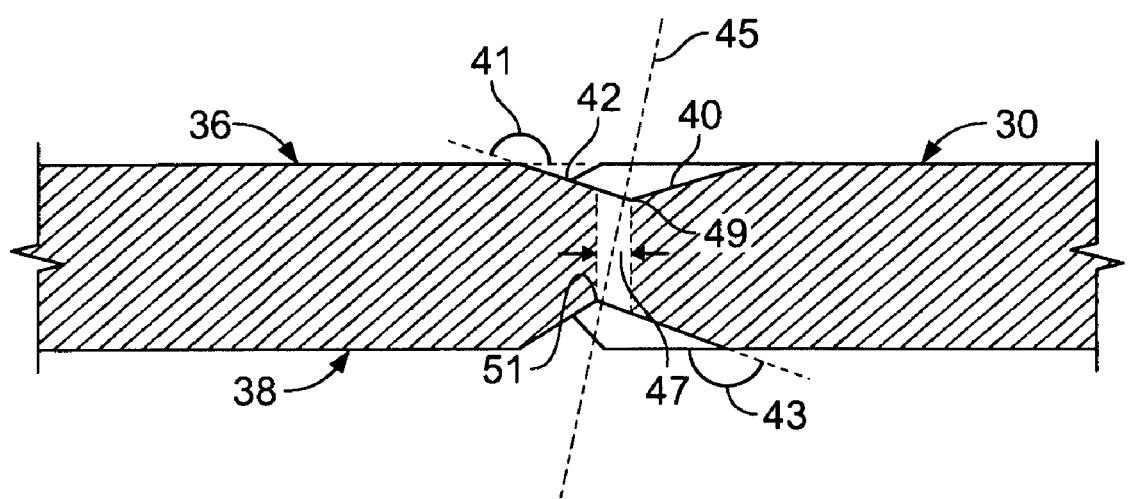

As shown in FIG. 4, in some examples, the break lines are scored into the upper and lower surfaces 36, 38 of the strip 30. The angle 41, 43 of each face 40, 42 of the score with the surface 36, 38 of the strip may be in the range of, for example, 30 degrees to 150 degrees. In some examples, the angle is 120 degrees. The angles of the respective faces 40, 42 with the surfaces 36, 38 need not be the same but could be different. The surfaces 40, 42 need not be flat but could be curved. The break lines may be formed by radius cuts having a depth of almost zero depth to about 0.060 inches deep. The cutting tool could be a "knife edge" type cutter or have a radius ground on the cutting tool, which would result in a groove that would have a radius rather than being sharp.

The valleys of the break lines 49, 51 may be aligned along a line 45 so that the offset 47 is small enough to assure that the strip can be severed manually. The offset 47 could be in the range, for example, of 0.0 to 0.030 inches.

The steel strip may have a thickness in the range of, for example, 0.005 inches to 0.060 inches, and a width in the range of, for example, 0.125 to 1.0 inches. The conduit or cable may have a diameter in the range of, for example, 0.375 to 4 inches.

Figure 5:
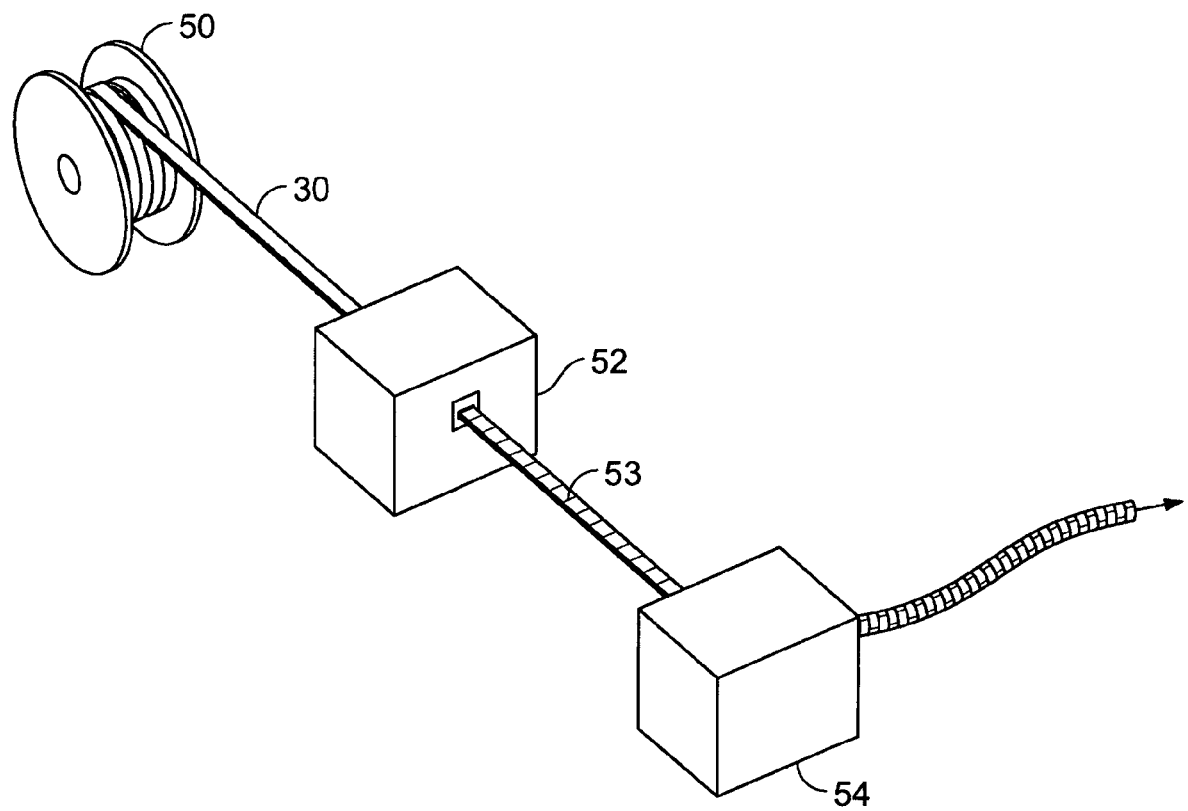
FIG. 5 is a schematic view of a production line.

In some examples, as shown in FIG. 5, to fabricate the conduit or conduit, the steel or aluminum strip 30 is withdrawn from a supply roll 50. A scoring machine 52 forms the break lines 53 (e.g., grooves) on the opposite faces of the strip at intervals along its length. The strip is fed through a convolver 54 (also called an armoring machine) which forms the helically wound conduit 56. The conductors may be inserted within the conduit as part of the convolving process to form a cable, or inserted later, for example, in the field after the conduit has been installed in the structure.

Figure 6A:
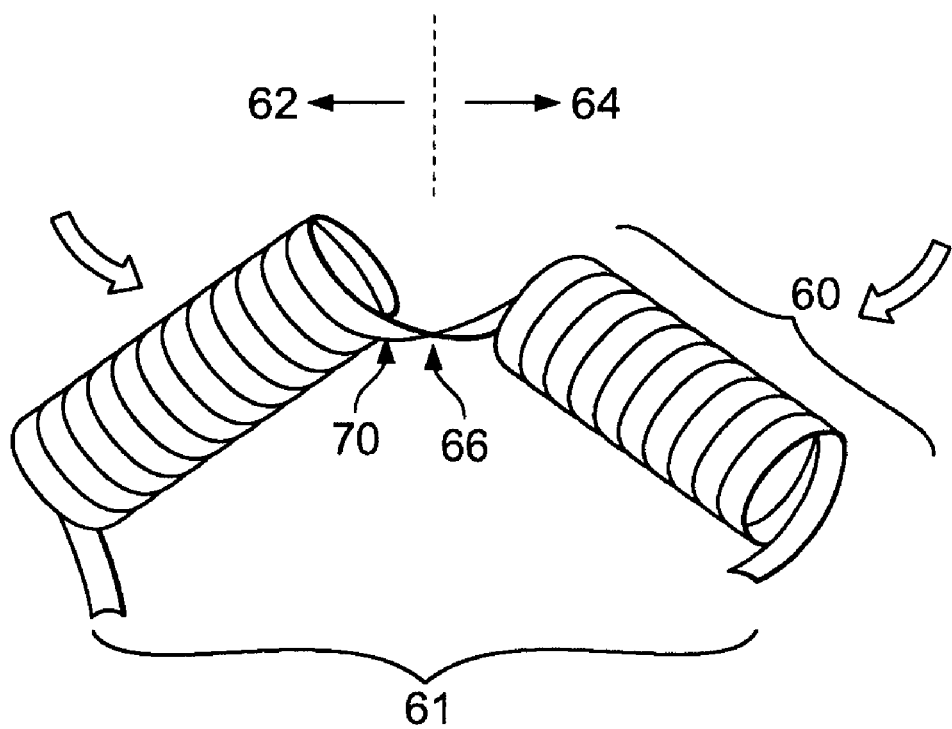
FIGS. 6A and 6B show the steps of breaking a conduit.
Figure 6B:
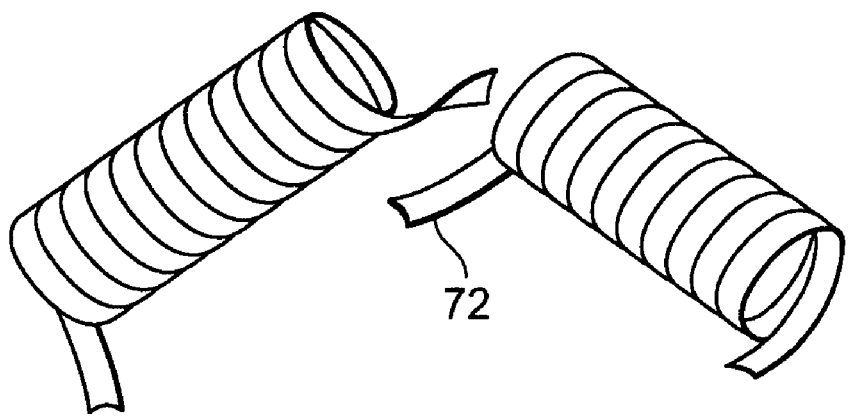
Figure 7A:
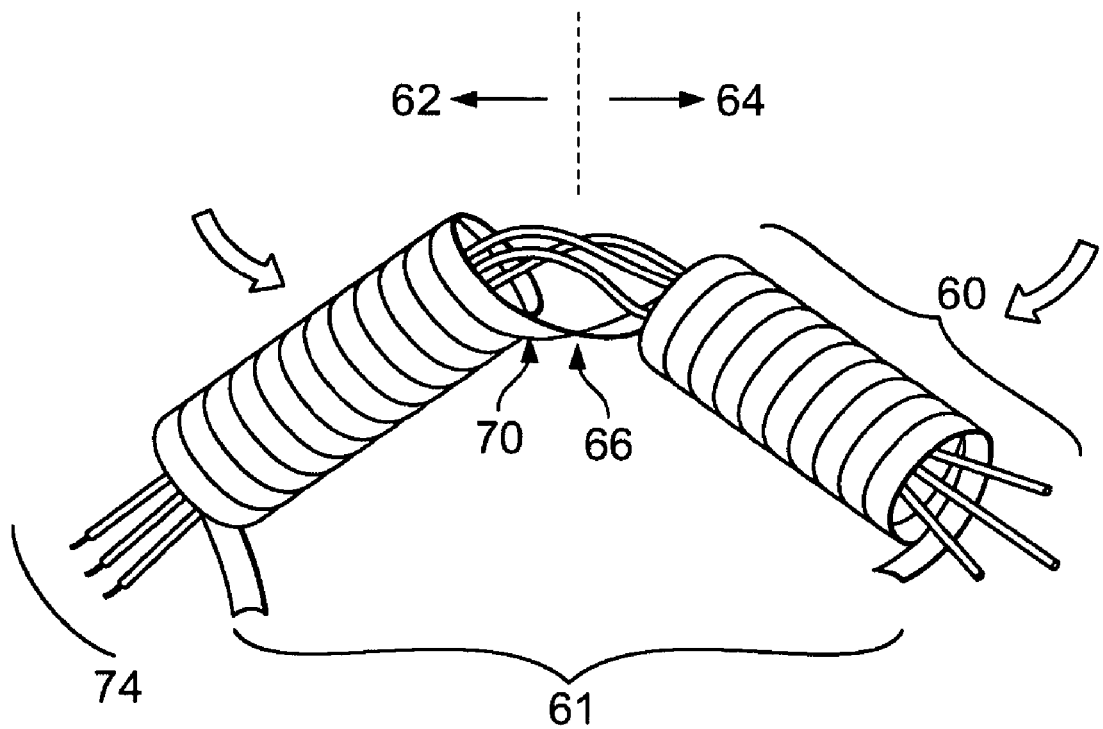
FIGS. 7A and 7B show the steps of breaking a cable.
Figure 7B:
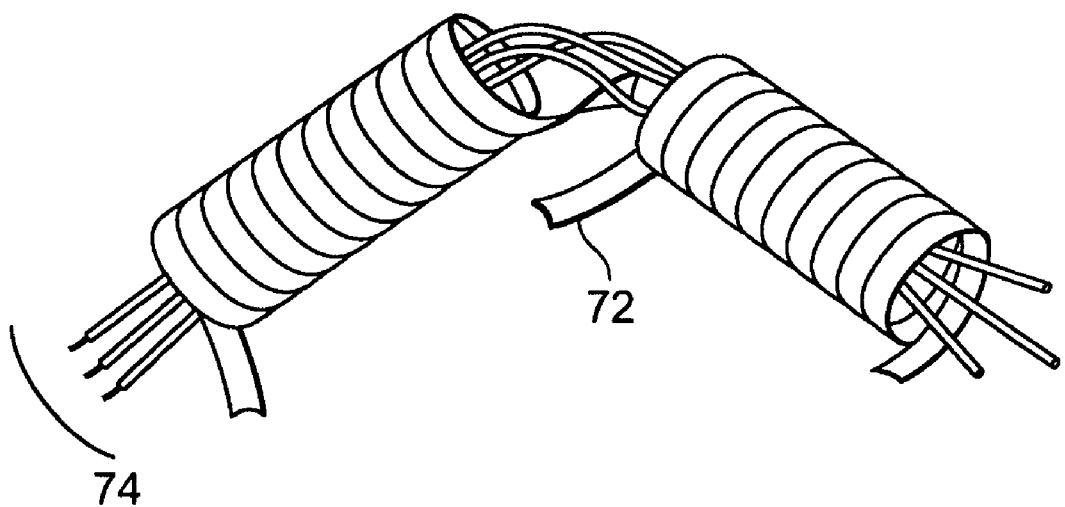

As shown starting in FIGS. 6A and 7A, a length 60 of the conduit or cable may be separated from a longer length 61 or supply in two steps. The first step is to grab the armor 61 on opposite sides 62, 64 of the desired break line 66 and bend the armor 61 until the helical wrapping of the armor comes apart (ruptures) at a location 70 near the break line. In the second step, as shown in FIGS. 6B and 7B, the two sides of the armor are twisted, bent, and/or contorted to cause the strip 72 of the armor to break at the break line. If conductors 74 are held within the cable, they are cut to complete the severing of the length of cable.

Other implementations are within the scope of the following claims.

For example, the armor need not be fabricated only of steel strip. The strip may be formed of steel, aluminum, alloys of steel and aluminum, or any other metal permitted by applicable standards, for example, Underwriters Laboratory standard 1. Non-metallic materials may also be used, including polyvinyl chloride (PVC), nylon, and other polymers and plastics.

In some examples, the sheath of the conduit or cable need not be helically wound but may be formed in other ways to be flexible and may have other configurations. For example, the sheath may have continuous walls formed by extrusion, molding, metal-rolling, or other techniques. The cross-section of the conduit or cable may be other than round, including square or rectangular.

The conduit may have a variety of different degrees of flexibility in a range from stiff to highly flexible.

The break lines need not be straight, and need not cross the entire width of the strip but could have a wide variety of other configurations. For example, each break line could end short of either or both sides of the strip. The break lines need not be continuous but could be interrupted at several places across the surface of the strip. The depth of the break lines could vary across the width. The break lines need not be lines, but could be regions in which breaking could be made to occur. Break lines in the form of regions could be of various sizes and shapes. Different break lines along a length of cable could have different degrees of breakability. The angle of a break line could be any angle within a broad range. The break lines could be curved rather than straight or have a wide variety of profiles. All of these variations, and others, could be designed to control a variety of breaking characteristics including the force needed to initiate the breaking, the force needed to continue the breaking once initiated, the "cleanness" of the edge that is formed on the end of the strip by the break, and others.

The break lines could be formed in the completed helically wound armor, conduit, or cable rather than in the strip from which the armor, conduit, or cable is formed. The break lines could be spaced so that they appear on one side of the conduit along its length, or so that different break lines appear on different sides of the conduit along its length.

The break lines may be formed by scoring, stamping, rolling, perforating, indenting, scratching, or puncturing, or by other techniques, including laser or chemical etching.

In some examples, an outer surface of the armor may be colored or otherwise marked by indicia, for example, in the manner or for a purpose described in U.S. Pat. No. 5,350,885, issued Sep. 27, 1994; U.S. Pat. No. 5,468,914, issued Nov. 21, 1995; U.S. Pat. No. 5,557,071, issued Sep. 17, 1996; U.S. Pat. No. 5,708,235, issued Jan. 13, 1998; RE 38,345, issued Dec. 16, 2003; U.S. Pat. No. 6,825,418, issued Nov. 30, 2004, and in U.S. patent application Ser. No. 10/058,225, filed Jan. 29, 2002; Ser. No. 10/920,278, filed Aug. 18, 2004, all of which are incorporated in their entirety by reference here.

What is claimed is:

1. Flexible breakable conduit or cable for electrical wiring, having at least one break comprising at least one transverse weakening groove present along the outer surface of the length of the conduit or cable, the at least one transverse weakening groove being transverse to the length of the flexible conduit or cable.

2. The conduit or cable of claim 1 in which the break comprises a break of reduced thickness of a wall of which the conduit or cable is formed.

3. The conduit or cable of claim 2 in which the break of reduced thickness comprises a groove or perforations.

4. The conduit or cable of claim 2 in which the thickness is reduced on both inside and outside surfaces of the wall.

5. The conduit or cable of claim 2 in which the break of reduced thickness comprises a line.

6. The conduit or cable of claim 1 in which the breaks are at intervals along a length of the conduit or cable.

7. The conduit or cable of claim 6 in which a wall of the flexible conduit or cable is formed of turns of a strip and the intervals are at least as frequent as the turns of the strip.

8. The conduit or cable of claim 6 in which the breaks occur at regular intervals along the length of the conduit or cable.

9. The conduit or cable of claim 1 in which the flexible conduit or cable comprises a helically wound metal strip.

10. The conduit or cable of claim 1 also including conductors within the conduit or cable.

11. The conduit or cable of claim 1 in which the outside of the conduit or cable bears indicia.

12. The conduit or cable of claim 11 in which the indicia comprises color.

13. The flexible conduit or cable of claim 1 wherein the at least one break has break lines scored at an angle of from 0 to about 15 degrees.

14. The flexible conduit or cable of claim 1 wherein the at least one break has at least one groove angled from about 30 degrees to about 150 degrees.

15. The flexible conduit or cable of claim 1 wherein the at least one break has break lines scored at an angle of from 0 to about 15 degrees, the break lines formed within opposing grooves angled from about 30 degrees to about 150 degrees, and wherein the outside of the conduit or cable bears color.

16. The flexible conduit or cable of claim 1 wherein the conduit or cable may be broken by hand manipulation of the conduit or cable.

17. The conduit or cable of claim 1 wherein the at least one break is visible on the outer surface of the conduit or cable.

18. An apparatus comprising the flexible conduit or cable of claim 1.

19. A flexible, breakable conduit or cable having a break comprising at least one transverse weakening groove present on an outer surface of the conduit or cable comprising a length of helically wound flexible conduit formed of a convoluted strip of steel or aluminum, the at least one transverse weakening groove being transverse to the length of the conduit or cable, transverse weakening grooves formed at successive locations along the length of the strip, and insulated electrical conductors housed within the conduit.

20. A method for producing a flexible conduit or cable having a break comprising at least one transverse weakening groove present on an outer surface of the conduit or cable, the at least one transverse weakening groove being transverse to the length of the conduit or cable, comprising forming a length of flexible conduit or cable to include at least one break comprising at least one transverse weakening groove along the outer surface of the length of the conduit or cable, the at least one transverse weakening groove being transverse to the length of the conduit or cable, wherein the forming includes creating a series of breaks comprising transverse weakening grooves along a length of a strip and includes forming grooves on both surfaces of the strip.

* * * * *